US007089200B2

(12) United States Patent
Bode

(10) Patent No.: US 7,089,200 B2
(45) Date of Patent: Aug. 8, 2006

(54) PAYROLL MANAGEMENT METHOD AND APPARATUS

(75) Inventor: Russell Bode, Mulgrave (AU)

(73) Assignee: Third Millennium Management PTY LTD (AU)

( * ) Notice: Subject to any disclaimer, the term of this patent is extended or adjusted under 35 U.S.C. 154(b) by 890 days.

(21) Appl. No.: 09/738,352

(22) Filed: Dec. 18, 2000

(65) Prior Publication Data
US 2001/0032119 A1 Oct. 18, 2001

Related U.S. Application Data

(60) Provisional application No. 60/172,795, filed on Dec. 21, 1999.

(51) Int. Cl.
G06F 17/60 (2006.01)

(52) U.S. Cl. .............................. 705/32; 705/1

(58) Field of Classification Search ................ 705/32, 705/10, 1
See application file for complete search history.

(56) References Cited

U.S. PATENT DOCUMENTS

| 4,323,771 | A | * | 4/1982 | Chalker et al. ............. 235/377 |
| 5,459,657 | A |   | 10/1995 | Wynn et al. |
| 5,508,977 | A | * | 4/1996 | Tymn ........................... 705/32 |
| 5,600,554 | A | * | 2/1997 | Williams ....................... 705/1 |
| 5,717,867 | A |   | 2/1998 | Wynn et al. |
| 5,842,182 | A | * | 11/1998 | Bonner et al. ................ 705/32 |
| 6,119,097 | A | * | 9/2000 | Ibarra ........................... 705/11 |
| 6,347,306 | B1 | * | 2/2002 | Swart ........................... 705/32 |
| 6,411,938 | B1 | * | 6/2002 | Gates et al. .................. 705/30 |
| 6,622,116 | B1 | * | 9/2003 | Skinner et al. ............. 702/183 |

FOREIGN PATENT DOCUMENTS

| AU | A-42815/97 | 4/1998 |
| WO | WO 9941707 A1 * | 8/1999 |

OTHER PUBLICATIONS

Williams "Payroll Made Easy: Developing a Web Based System for Student Employee Payroll"; Oct. 2000.*
Yebernetsky ("Track Trends in Staffing Enterprise-wide. (Valley Health System's use of Kronos' Timekeeper labor management solution) (Company Operations)"); Jun. 1999; Health Management Technology, 20, 5, 32; Dialog file 275, Accession No. 023004844.*
Shulman ("Automated time and attendance system pilot test"); Nov. 1983; Supermarket Business, V38, p. 12(2); Dialog file 148, Accession No. 01889136.*

* cited by examiner

Primary Examiner—Romain Jeanty
(74) Attorney, Agent, or Firm—Stites & Harbison PLLC; Marvin Petry

(57) ABSTRACT

The present invention provides a method and apparatus for maintaining a payroll, the method involving: preparing a roster; storing the roster in a processing means; receiving in the processing means attendance information pertaining to one or more workers; and comparing the roster and the attendance information by means of the processing means and thereby preparing a payroll. In one embodiment, the method includes authorizing the payroll in respect of a respective worker if the attendance information pertaining to the respective worker meets predetermined criteria.

18 Claims, 2 Drawing Sheets

PAYROLL MANAGEMENT METHOD AND APPARATUS

This application claims the benefit of Provisional Application No. 60/172,795, filed Dec. 21, 1999.

FIELD OF THE INVENTION

The present invention relates to a method and apparatus for managing payrolls, of the type where employees are paid according to the time actually attended or worked.

BACKGROUND OF THE INVENTION

Existing systems for managing payrolls of this type typically require the preparation of rosters, and the entering by employees (whether by time clock or time sheet, etc) of the time actually worked. The time actually worked will commonly not correspond exactly to the rostered hours, owing to employee illness, late attendance, overtime, early departure, etc.

Details of the accumulated time worked—as recorded on a time sheet or otherwise—is passed to and authorised by a supervisor, and then sent to payroll administration for processing. The times and accumulated hours actually worked are compared with the roster so that habitual diligence or tardiness, absences due to sickness etc, or any other significant issue can be monitored, recorded and appropriate action—if any—taken.

Payroll administration posts all wage amounts to specific accounts in the general ledger and accrual accounts for future payments. Statutory reports and EFT (electronic funds transfer) submissions are undertaken and the appropriate sums forwarded to the relevant authority or financial institution Payroll administration must also prepare pay slips, which are distributed to each employee with—if EFT is not used—pay attached.

Periodically, statements of yearly earnings and income tax deductions, etc (referred to in some jurisdictions as "Group Certificates") may be prepared and distributed.

A flow chart for an example of such a prior art system is shown at 100 in FIG. 1, from the step 102 of recruiting employees through steps 104 to 110, to the ultimate step 122 of the issuing of Group Certificates.

Such prior art systems, however, require a large quantity of data entry, including into the initial roster, into time sheets, and into the payroll administration system.

SUMMARY OF THE INVENTION

It is an object of the present invention to provide a payroll method and apparatus that reduces the amount of data entry required by combining a number of these steps.

According to the present invention, therefore, there is provided a method of maintaining a payroll, involving:
  preparing a roster;
  storing said roster in a processing means;
  receiving in said processing means attendance information pertaining to one or more workers; and
  comparing said roster and said attendance information by means of said processing means and thereby preparing a payroll.

Thus, the integration of roster maintenance and attendance information entry obviates the need for separate payroll data entry or for a time sheet. If an actual time sheet is still desired (for example, for an employee's records or to conform with legal requirements), a time sheet can readily be generated for each employee from the attendance information. However, time sheets are not required to prepare the payroll.

The term "attendance information" is used to refer to any measure of the time worked by a worker. In some cases a worker may be employed in a number of different capacities within the one workplace, each capacity having a different pay rate. In such cases, the attendance information would preferably include information pertaining to the attendance of the worker in each separate capacity.

The attendance information preferably includes arrival or commencement time, and departure or finishing time.

Preferably said method includes receiving said attendance information from each respective worker.

Preferably said method includes receiving said attendance information by means of data entry means operable by each respective worker.

Preferably said data entry means comprises an identity card and an identity card reader. The card may be a smart card. Alternatively, the data entry means may comprise a keypad, a fingerprint reader or an iris reader.

Thus, the data entry means can identify each worker and send to the processing means the identity of that worker with time of arrival or departure.

The step of preparing the payroll will not usually include authorising or paying the payroll; authorising the payroll would usually be regarded as separate operation to be performed by a person. However, if the attendance information for any particular worker meets predetermined criteria (such as agreeing within certain tolerances with the original roster), the method may include the additional step of authorising the payroll as it pertains to that particular worker. For example, if a worker has commenced and finished work within 5 minutes of every rostered starting and finishing time, and the worker's total attendance is within 1% of the total hours rostered for that worker, the method may include automatically authorising the worker's pay.

In such an embodiment, the method preferably includes transferring the pay by electronic funds transfer to the worker's bank account, calculating and transferring the required income tax to the appropriate statutory authority, and producing a pay slip.

The method preferably includes measuring compliance of workers with the roster and providing an output indicating breaches of that compliance greater than a predetermined level.

The present invention also provides an apparatus for maintaining a payroll, comprising:
  roster preparation means; and
  processing means for storing said roster, receiving attendance information pertaining to one or more workers, and comparing said roster and said attendance information;
  whereby said processing means is configured or operable to preparing a payroll.

The attendance information preferably includes arrival or commencement time, and departure or finishing time.

Preferably said apparatus includes data entry means operable by each worker to enter respective attendance information.

Preferably said data entry means comprises an identity card and an identity card reader. The card may be a smart card. Alternatively, the data entry means may comprise a keypad, a fingerprint reader or an iris reader.

Preferably the apparatus includes authorisation means for determining if said payroll or a part thereof meets predetermined criteria and authorising said respective payroll or part thereof if predetermined tolerances are met. Preferably said apparatus includes fund transfer means for transferring funds according to said authorisation. Preferably said apparatus includes pay slip preparation means for preparing pay slips.

Preferably said apparatus includes compliance monitoring means for monitoring the compliance of workers to said roster and outputting or indicating breaches of that compliance greater than a predetermined level.

The present also provides a computer program product directly loadable into the internal memory of a computer, comprising software code portions for performing the steps of the method described above when the product is run on a computer.

The present invention still further provides a computer program product stored on a computer useable medium, comprising computer readable program means for causing a computer to perform the steps of a method as described above.

The present invention still further provides a computer readable medium, having a program recorded thereon, wherein said program is for making a computer execute a method as described above.

BRIEF DESCRIPTION OF THE FIGURES

A preferred embodiment of the present invention will now be described, by way of example, with reference to the accompanying drawings, in which.

DETAILED DESCRIPTION OF THE PREFERRED EMBODIMENT

Figure 1:
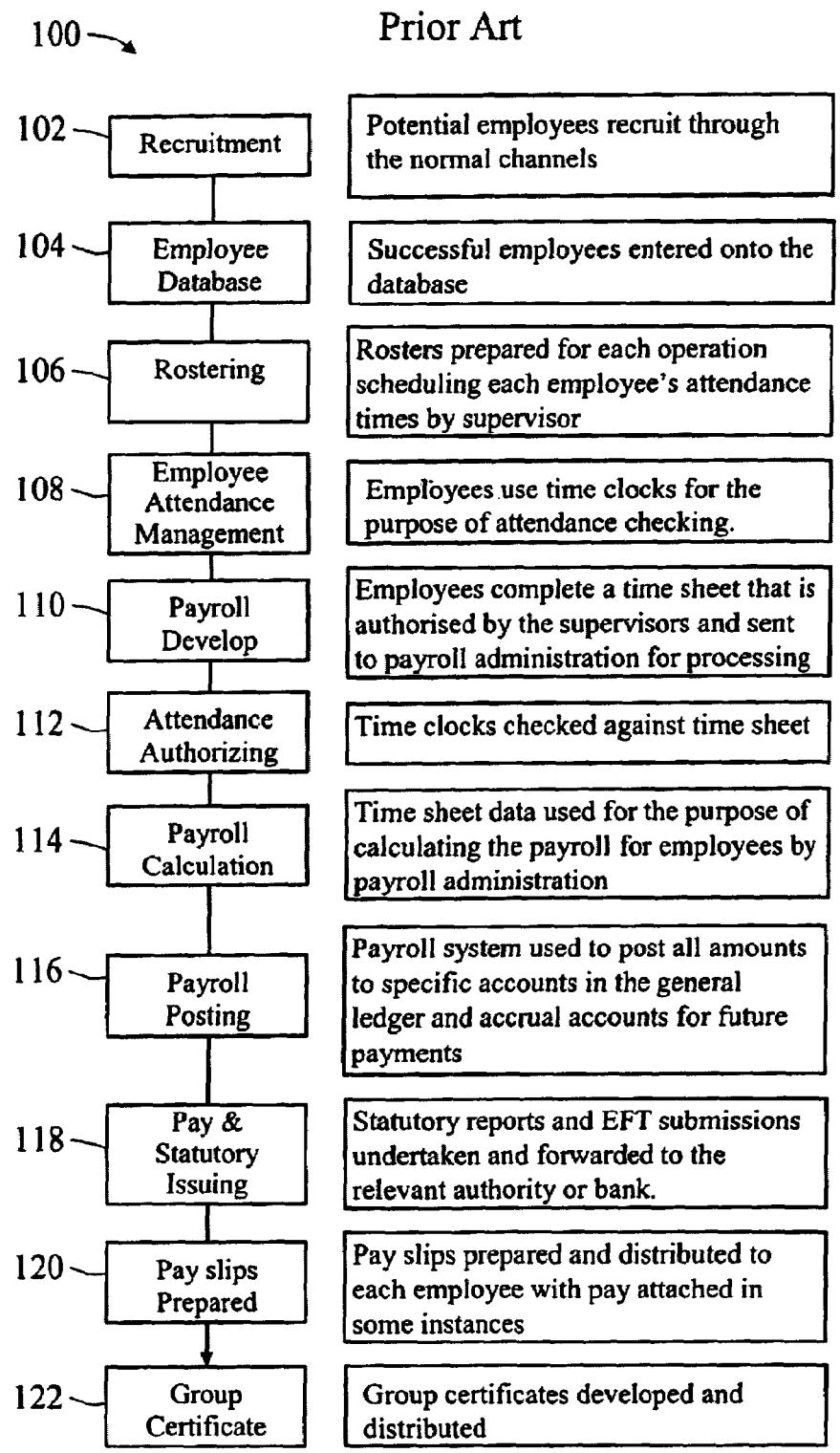
FIG. 1 is a flow chart of a prior art payroll management system.
Figure 2:
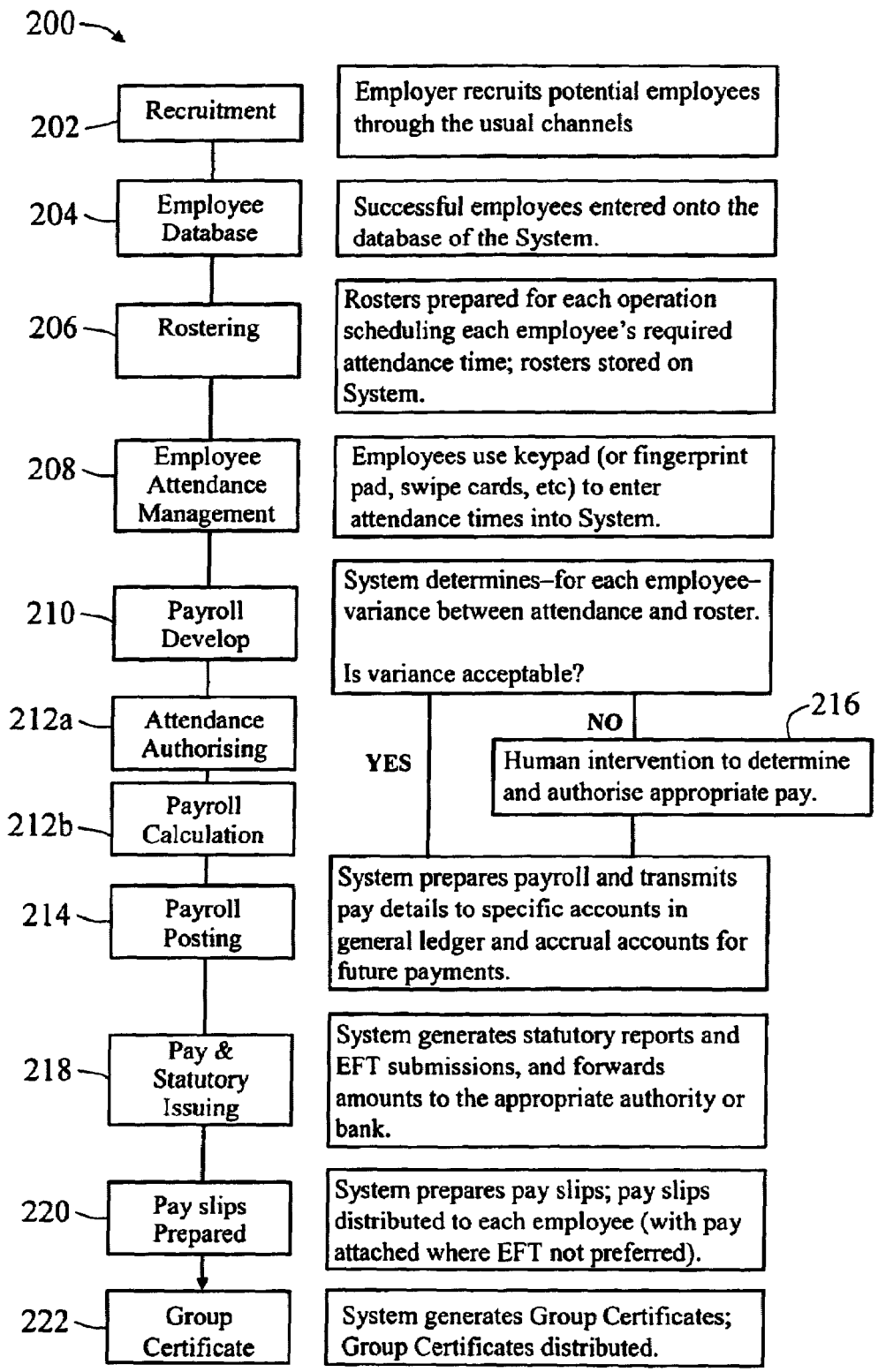
FIG. 2 is a flow chart of a payroll management system according to a preferred embodiment of the present invention.

A flow chart of a payroll management system according to a preferred embodiment of the present invention is shown in FIG. 2 at 200. The system includes a computer running a program that carries out each of the functions (other than those requiring human intervention) described below.

Potential employees are recruited 202 through normal channels, and successful employees entered 204 onto a database of the system.

A roster is developed 206 (preferably on the system directly) and stored on the system, for each operation within an organisation. Each roster is costed by the system. Each roster incorporates the planned or required attendance of each employee of the respective department within that organisation. Management advises employees of their required attendance over a specified period of time by means of such a roster.

Employees record 208 their actual attendance by means of electronic time clocks linked to the system, and operated with a keypad. Each employee is allocated a Personal Identification Numbers (PIN), which is entered upon arrival and at departure. The system identifies the employee on the basis of the PIN, and records arrival and departure times for that employee.

In other preferred embodiments, a fingerprint identification pad is provided instead of a keypad and PIN: an employee places a finger or thumb as required on the pad so that the system can identify the employee and record the corresponding arrival or departure time.

Attendance for each employee is then automatically compared 210 by the system with the roster of that employee and, if they are in agreement 212a, the appropriate pay is calculated 212b: no further input is required. The pay data can then be forwarded 214 electronically from the system to the general ledger, paymaster or even directly to the bank for the payment of the employee's wages and other benefits.

If the time and attendance function identifies a variance between the roster and the times of attendance of that employee, the system will flag the variance and require the human intervention 216 of management to decide on what basis that employee will be paid for the relevant period. It may be that a reduced pay is deemed appropriate, or—if management have been notified of a legitimate excuse (such as one due to illness or compassionate leave)—the appropriate sick pay etc calculated. This function can be undertaken at the point of the pay authorization or payroll run.

The system includes a database containing wage rate data, (in some jurisdictions termed "awards") to enable the aforementioned calculation of the appropriate pay. This data is also used to calculate statutory charges associated with the employment of each employee. The system also uses this data to predict the projected payroll cost of a particular roster.

Once each part of the payroll has been approved (by the system where attendance/roster variance is within an acceptable level, or manually where not) pay can be electronically forwarded to the appropriate accounts 218.

The system then generates 220 the necessary pay slips for the employees, and payroll reports (including details of variance from the roster, wages, superannuation, tax deductions, etc, as well as wage cost predictions) for management. At step 222 the system generates Group Certificates, which are then distributed.

As the rosters are stored by the system, the rosters can be copied from previous periods to expedite the development of specific subsequent rosters which are tailored for specific trading conditions.

The system can also be used to process pays without the need for a formal time of attendance process by way of the approving the pay by using the pay roster function. This can be used in instances that an employer does not want to verify attendance of all or some of the employees.

The system also allows employees to access their own rosters, attendance details and pay details, thereby reducing the cost of distributing such data and material. It also enables employees who do not wish to receive formal documents of their pays etc other than their bank details not to receive them. This function lowers the cost of payroll processing.

Further, employees can access the system to notify non-availability for specific future periods, to ensure that rosters prepared subsequently by management only include available employees.

What is claimed is:

1. A method for use in an apparatus for maintaining a payroll, the method comprising:

preparing a roster comprising a work schedule or list of duties in a roster preparation means of the apparatus;

storing said roster in a processing means of the apparatus;

receiving in said processing means attendance information pertaining to one or more workers;

preparing said payroll in the processing means;

comparing said attendance information for the respective workers with the roster in said processing means to determine if the attendance information pertaining to the respective worker agrees with the roster to within a predetermined tolerance, wherein said predetermined tolerance comprises:
(i) agreement to within a predetermined time period between rostered and actual starting times, between rostered and actual finishing times, or both, for said respective worker, or
(ii) agreement to within a predetermined time period or factor between rostered and actual total attendance for said respective worker; and authorizing the payroll in an authorization means of the apparatus for each of said workers whose attendance information agrees with the roster within the predetermined tolerance;

wherein the payroll is prepared in the processing means on the basis of the roster rather than the attendance for the respective workers whose payroll has been authorized.

2. A method as claimed in claim 1, wherein said attendance information includes arrival or commencement time, and departure or finishing time.

3. A method as claimed in claim 1, including receiving said attendance information from each respective worker.

4. A method as claimed in claim 1, including receiving said attendance information by means of data entry means operable by each respective worker.

5. A method as claimed in claim 1, wherein said data entry means comprises an identity card and an identity card reader.

6. A method as claimed in claim 5, wherein said card is a smart card.

7. A method as claimed in claim 1, including automatically paying, or initiating the paying of, said respective worker.

8. A method as claimed in claim 1, including measuring compliance of workers with the roster and providing an output indicating breaches of that compliance greater than a predetermined level.

9. A computer program product directly loadable into the internal memory of a computer, comprising software code portions for performing the steps of the method of maintaining a payroll as claimed in claim 1 when said product is run on a computer.

10. A computer program product stored on a computer useable medium, comprising computer readable program means for causing a computer to perform the steps of the method of maintaining a payroll as claimed in claim 1.

11. A computer readable medium, having a program recorded thereon, wherein said program is for making a computer execute the method of maintaining a payroll as claimed in claim 1.

12. A method as claimed in claim 1, the method further comprising costing said roster.

13. An apparatus for maintaining a payroll, comprising:
roster preparation means for preparing a roster comprising a work schedule or list of duties;
processing means for storing said roster, receiving attendance information pertaining to one or more workers, and for preparing said payroll;
wherein the processing means compares said attendance information for the respective workers with said roster for determining if the attendance information pertaining to the respective workers agrees with the roster to within a predetermined tolerance;
the apparatus includes authorization means responsive to the processing means for authorizing the payroll for each of said workers whose attendance information agrees with the roster within the predetermined tolerance;
wherein the processing means prepares the payroll on the basis of the roster rather than the attendance for the respective workers whose payroll has been authorized by the authorization means.

14. An apparatus as claimed in claim 13, including data entry means operable by each worker to enter respective attendance information.

15. An apparatus as claimed in claim 14, wherein said data entry means comprises an identity card and an identity card reader.

16. An apparatus as claimed in claim 13, including fund transfer means for transferring funds according to said authorizing of said respective payroll or part thereof.

17. An apparatus as claimed in claim 13, including compliance monitoring means for monitoring the compliance of workers to said roster and outputting or indicating breaches of that compliance greater than a predetermined level.

18. An apparatus as claimed in claim 13 wherein the processing means is operable to cost said roster.

* * * * *